S. LANKHEET.
BRAKE.
APPLICATION FILED JULY 20, 1920.

1,397,430.  Patented Nov. 15, 1921.

INVENTOR.
S. Lankheet.
BY Victor J. Evans
ATTORNEY.

UNITED STATES PATENT OFFICE.

SANDER LANKHEET, OF HAMILTON, MICHIGAN.

BRAKE.

1,397,430.  Specification of Letters Patent.  Patented Nov. 15, 1921.

Application filed July 20, 1920. Serial No. 397,587.

*To all whom it may concern:*

Be it known that I, SANDER LANKHEET, a citizen of the United States, residing at Hamilton, in the county of Allegan and State of Michigan, have invented new and useful Improvements in Brakes, of which the following is a specification.

This invention relates to a brake and has for its primary object the construction of a brake that will operate in a smooth manner thereby dispensing with a jerky action which is a disadvantage of brakes now in use.

An object of the invention is the construction of a brake in which certain parts will give when pressure is applied to the brake in too sudden a manner.

A feature of the invention is the novel manner of associating the operating means with the ends of the brake band so that the latter will be contracted, but such contraction regulated automatically.

With these and other objects in view the invention will be better understood from the following detailed description taken in connection with the accompanying drawing wherein.

Figure 1:
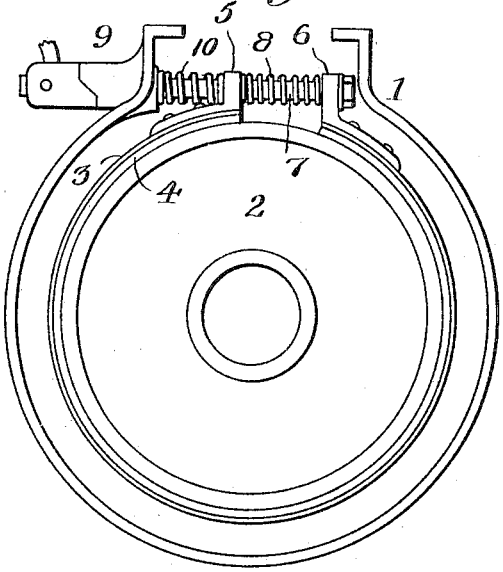
Figure 1 is an elevation of one construction of my invention.

Again referring to the drawing and more particularly to Fig. 1 the numeral 1 designates my improved brake in its entirety co-operating with the movable device 2 which may be a drum of the brake element of an automobile. My improved brake consists of a band 3 having a brake lining 4. The ends of the band are connected to plates 5 and 6 each provided with a hole for accommodating the operating bolt 7. Encircling this bolt is the usual spring 8 acting against the ends of the band for forcing them apart.

The numeral 9 designates the ordinary operating means now in use for giving movement to the bolt 7 and thereby contracting the band, the spring 8 expanding the band to normal position upon the release of the operating means. Also arranged upon the bolt 7 is a second spring 10 of a tension great enough that in the ordinary operation of the operating means the same will not contract but upon excessive pressure being brought to bear suddenly upon said means this spring will be contracted by the pressure of plate 5 thereby limiting the contraction of the band and pressure thereof upon the drum 2. Thus in a very simple manner I am able to prevent the band from being subject to a quick excessive contractile action which, when takes place, causes a jerky action of the brake.

Figure 2:
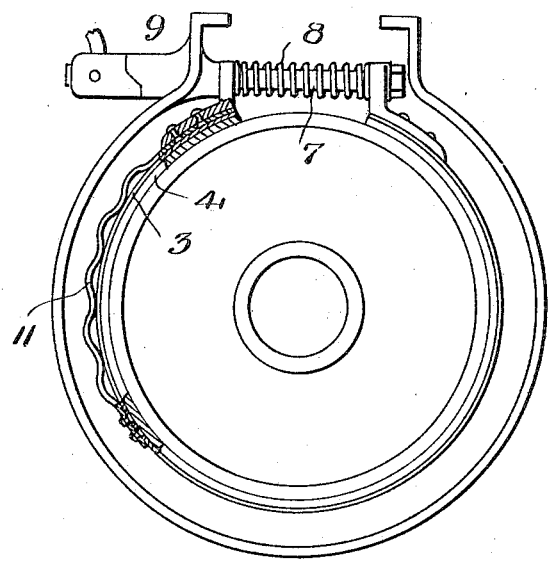
Fig. 2 is a view of another construction.

In Fig. 2 I have changed the position of the spring and its construction. In this particular instance I have illustrated a corrugated leaf spring 11 having one end secured to the band and its other end secured to the plate 5, which, in this particular instance, is not connected to the end of the band, thus allowing the free end of the band to move according to the expansion of the spring 11.

From the foregoing description taken in connection with the accompanying drawing it will be apparent that I provide a brake of very simple construction capable of creating a braking action in a more smooth manner than brakes now on the market are capable of.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A brake comprising a brake band, means for mechanically forcing the ends of the brake band together, and a spring directly providing a connection between said means and brake band.

2. A brake comprising a brake band, operating means rigidly connected to one end of the brake band, and a spring providing a connection between the other end of the brake band and said means.

3. A brake comprising a brake band, operating means rigidly connected to one end of the brake band, and a crimped leaf spring providing a connection between the other end of the brake band and said means, said spring having one end riveted to the brake band, the other end riveted to said operating means.

In testimony whereof I affix my signature.

SANDER LANKHEET.